Patented Jan. 1, 1946

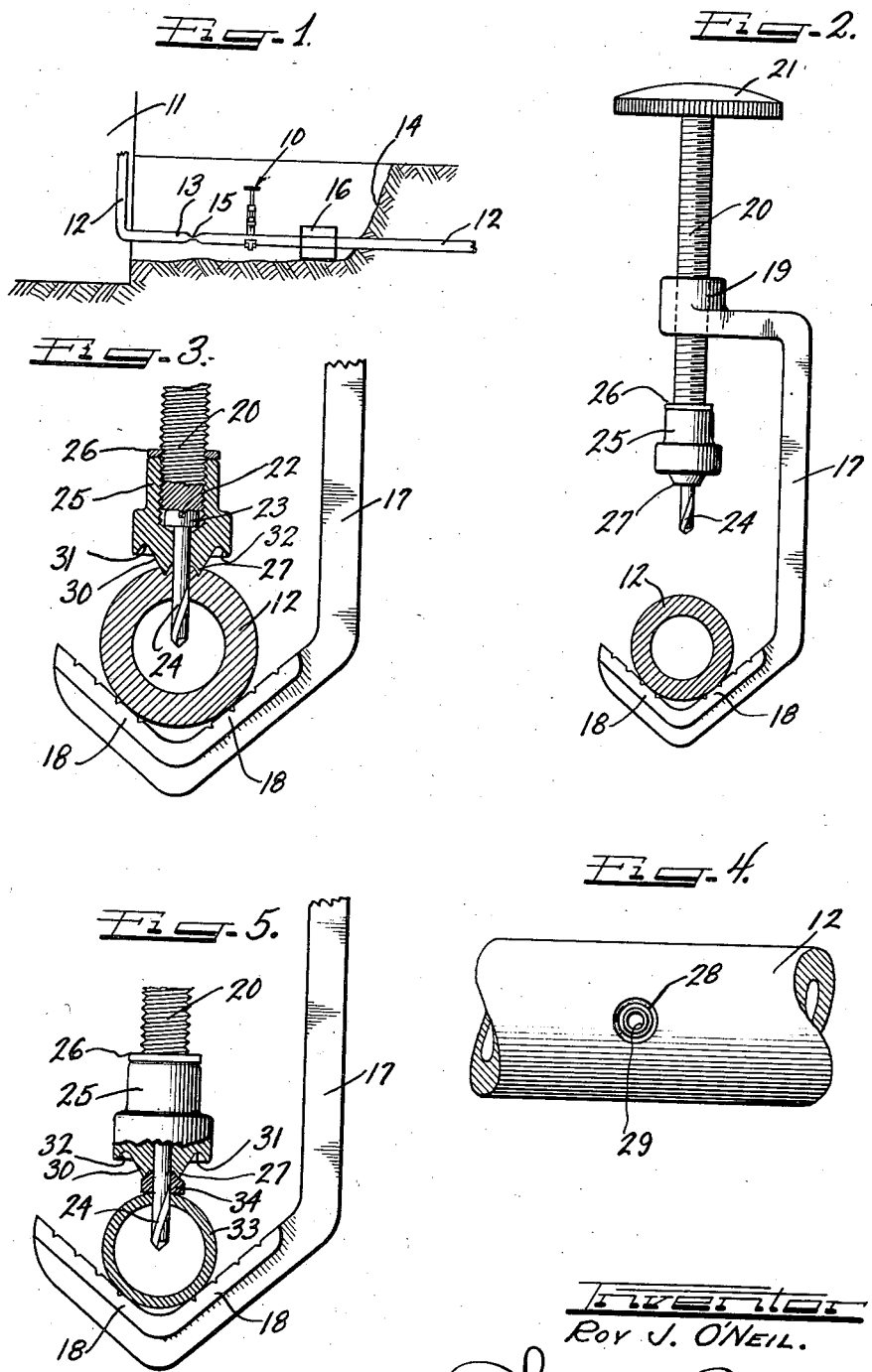

2,392,059

UNITED STATES PATENT OFFICE 2,392,059

PIPE TAPPING DEVICE

Roy J. O'Neil, Aurora, Ill.

Application November 6, 1942, Serial No. 464,727

9 Claims. (Cl. 77—37)

This invention relates to improvements in a pipe tapping device highly desirable for use as a water main freeze indicator to determine when a freeze in a broken water main is effected, although the invention may be used for other and various purposes as will be apparent to one skilled in the art.

Frequently, it is desirable to drill a hole in a portion of a pipe line carrying fluid under pressure to determine whether or not that fluid is under pressure at the time, such for example as the testing of a freeze in a water main. This is frequently done out of doors in cold weather, and when an opening is made in the pipe or conduit carrying the fluid under pressure, obviously the fluid forcibly exits from the opening, with the result that the surrounding property may be damaged and the operator may be adversely affected, especially in cold weather, by the fluid. It is also desirable to be able to instantly stop the exit of fluid, govern the amount of escaping fluid, and otherwise control the escape of fluid until the pipe has been mended or the pressure has been reduced.

While many and various types of pipe tapping devices heretofore have been provided, such devices were objectionable in many respects in that they did not control the leakage of fluid from the pipe being tapped, were not able to prevent the forceful discharge of this fluid over the surroundings as well as over the operator attending the device, and had no means by which the fluid tending to escape could be governed in its action as well as instantly stopped.

With the foregoing in mind, it is an important object of the instant invention to provide a pipe tapping device arranged to drill an opening in a pipe and govern the direction of fluid escaping from that opening.

Another object of the instant invention is the provision of a pipe tapping device having a part thereof arranged to function as a valve, said part cutting its own seat in the pipe being tapped so as to have an effective valve control over fluid escaping from an opening made in the pipe.

A further feature of the instant invention resides in the provision of a pipe tapping device arranged to not only make an opening in a pipe carrying fluid under pressure but also to minutely control the escape of fluid from the opening so made.

Still another feature of the invention resides in the provision of a pipe tapping device capable of making an opening in a pipe carrying fluid under pressure and arranged to control to a fine degree the amount of fluid escaping through the opening, the direction of travel of escaping fluid, or prevent any escape whatever of fluid.

Still another object of the instant invention resides in the provision of a pipe tapping device so arranged as not only to make an opening in a pipe carrying fluid under pressure, but also to control the fluid tending to escape from the pipe through the opening, the device being so constructed that it is only necessary for the operator to manipulate one portion of the device to establish the opening in the pipe and control the escape of fluid from that opening or prevent the escape of fluid from the opening.

A further object of this invention resides in the provision of a pipe tapping device incorporating a novel and simplified bit holding arrangement wherein the bit holder functions additionally as a means for controlling the action of the fluid tending to escape from the pipe being tapped.

Another object of the invention is the provision of a pipe tapping device highly desirable for use in connection with pipes made of relatively soft material, such for example as lead, although the device is adaptable by a very simple operation for similar use in connection with pipes of harder materials.

It is also an object of the invention to provide a pipe tapping device which is durable, economical to construct, extremely easy and rapid to manipulate, and which effects a complete control over the escape of fluid from a pipe being tapped.

While some of the more salient features, characteristics and advantages of the instant invention have been above pointed out, others will become apparent from the following disclosures, taken in conjunction with the accompanying drawing, in which:

Figure 1 is a fragmentary diagrammatic illustration showing one important use of a device embodying principles of the present invention;

Figure 2 is a view showing the pipe tapping device itself in elevation, with the pipe being worked upon shown in section;

Figure 3 is an enlarged fragmentary part elevational part sectional view showing the pipe tapping device in vertical section after the pipe has actually been tapped;

Figure 4 is a fragmentary top plan view of the tapped pipe of Figure 3; and

Figure 5 is a view similar in character to Figure 3 but illustrating a slightly different form of construction used especially for pipes of harder materials.

As shown on the drawing:

The illustrated embodiment of the instant invention is shown in one of its important usages in Figure 1, and is generally indicated in this figure by numeral 10. In this particular showing, the device is illustrated in operative position to function as a water main freeze indicator, for illustrative purposes.

A building 11 receives a supply of water through a pipe 12 which extends from the building under ground to the general supply main, usually under the street. Let it be assumed that the pipe or main 12, by way of example, is of relatively soft material such as lead, and that a break occurred in the pipe as indicated at 13. In repairing such a break, an excavation is made in the ground adjacent the dwelling to provide a hole 14 to expose the pipe. A pinch 15 is then made in the pipe upon the supply side of the break to cut off further leakage through the break. Then, on the supply side of the break, a freeze is made. That is, the water in the pipe for a short distance is frozen, so that the break may be repaired without danger of leakage during the repair operation. This freeze may be made by packing ice and salt around the pipe, but is preferably made by the packing of the pipe in blocks of dry ice so that the freeze may be accomplished more expeditiously. The dry ice freeze packing is indicated at 16, and this packing must be carefully controlled so that no injury results to the good portion of the pipe 12 by virtue of the freeze, and yet the freeze must be sufficient to preclude leakage of water through the pipe. Therefore, it is highly important to know just at what time the freeze actually becomes effective, so that repairs may be instantly begun, and the freeze is not maintained any longer than is absolutely necessary. To this end, the pipe is tapped between the freeze 16 and the pinch 15 or break 13. Obviously, if the pipe is tapped prior to the freeze becoming effective, there will be a considerable forceful leakage of water through the tapped opening, working conditions will become precarious within the hole 14, and the operator will likely have his clothing saturated. However, the exact time of the freeze may be effectively determined, undue leakage prevented, the operator's clothing will remain dry, and there will be safe working conditions within the hole by virtue of the use of a device 10 embodying improvements of the instant invention.

With reference to Figures 2 and 3, it will be seen that the device 10 embodies a yoke 17 shaped at one end to provide a pair of fixed angular gripping jaws 18 for engaging the part 12. These jaws may be notched or serrated, if so desired. At the other end thereof the yoke is preferably provided with an integral boss 19 having a threaded bore therethrough to accommodate a threaded drill stem 20 having an operating wheel or handle 21 on its outer end.

With reference more particularly to Figure 3, it will be seen that the drill stem 20 terminates squarely at its lower end, with the exception of a diametral rib 22 which engages in a screw slot in the head 23 of a bit 24 which may be of any suitable diameter depending upon conditions. With the bit engaged with the drill stem in the manner shown in Figure 3, it will be seen that the drill bit will be positively rotated with the stem by actuation of the handle 21. It will also be noted that it is a very simple expedient to remove and change bits as may be desired, that the bit is quite economical in construction, and the drill stem itself will outlast many bits.

The bit is held in operative connection with the drill stem by means of a suitable bushing 25 having a threaded opening in its upper portion of sufficient size to engage the lower end of the drill stem and accommodate the head 23 of the bit, and having an opening in its lower portion in the nature of a clean bore through which the bits extends, as clearly seen in Figure 3. Obviously, it is a simple expedient to utilize a differently sized bushing with each differently sized bit, and a suitable complement of variously sized bushings and bits may be carried with the device. After the bushing has been tightened in position upon the drill stem, a suitable keeper or lock washer 26 may be threaded down tight against the top of the bushing to prevent unintentional loosening.

The bushing 25 is so constructed as not only to determine the direction of fluid under pressure escaping from the pipe 12 after the tap has been made, but is also constructed to minutely control the escape of such fluid from the pipe. To this end, the lower or outer end of the bushing is shaped in the form of an annular knife-edge 27 around the bit, and after the bit has passed through the adjacent wall of the pipe 12, this annular knife-edge will cut a circular V groove 28 in the wall of the pipe around the opening 29 made by the bit, as seen in Figure 4. This V groove 28 functions as a valve seat, and the annular knife-edge 27 functions as a valve in controlling the flow of fluid through the opening 29 made by the bit.

After the opening 29 has been made in the pipe and the valve portion 27 has bitten into the wall of the pipe, to form the groove 28, there will be no leakage of fluid whatever from the opening 29. A slight loosening by reverse turning of the drill stem will open the valve part and permit a leakage through the opening 29 which can be effectively controlled as to amount. Thus by a series of relatively slight manipulations of the drill stem, almost the exact instant the freeze 16 takes effect can be determined, because after the freeze is once effected there will be no further leakage through the opening 29 although the drill bit be entirely removed therefrom.

In the event the tap is made in the pipe prior to the effectiveness of the freeze, there will be a leakage before the valve part 27 has had time to take effect, and this leakage will be under substantially full main pressure. It is desirous, therefore, to direct such leakage away from the operator.

To this end, the bushing 25 is provided with an outwardly sloping wall 30 leading rearwardly from the valve portion 27. This wall 30 terminates in a relatively rounded V groove 31, and the outer wall of this groove is inclined outwardly and in a direction back toward the pipe 12 as indicated at 32. Thus, any forceful leakage from the pipe will be directed along the wall 30, into the groove 31, and then directed away from the operator along the wall portion 32, so that all squirting of fluid will be in a direction back toward the pipe 12.

In Figure 5 I have illustrated a slightly modified form of construction for use in connection with a pipe 33 which is made of material too hard for the valve portion 27 of the bushing to bite into the wall of the pipe. In this showing, the entire construction of the tapping device is the same as previously described. In addition, a resilient gasket 34, of rubber or any other suitable material, is slipped over the drill bit 24. This gasket is preferably given a somewhat frusto-conical shape at its upper end to seat within the valve 27 of the bushing around the drill bit so that it may more firmly keep its position. Leakage through the opening made by the bit 24 is prevented by compression of the gasket around the opening, the gasket being illustrated under compression in Figure 5. Upon release of the compression, in the event there is a leakage through the opening made by the drill, the squirting fluid will pass along the wall 30 of the bushing, into the groove 31, and be guided away from the operator in the manner above described. In all other respects, save for the operation of the gasket, the structure shown in Figure 5 operates in exactly the same way as the previously described structure shown in Figures 2 and 3.

From the foregoing, it is apparent that I have provided a novel pipe tapping device highly desirable for use as a water main freeze indicator, or for use in some other respects where it is desired to tap a pipe containing fluid under pressure, and control that pressure and prevent undue leakage of fluid from the pipe. It will be noted that the device is simple in construction, and the operator may, by the manipulation of a single handle, not only effectively control the amount of fluid emanating from a tapped pipe, but control the direction of leaking fluid so that it will be guided away from the operator, and stop the leakage of fluid at will. It is obvious that the device may be economically manufactured, is highly efficient, and extremely durable.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. In a water pipe freeze indicator, a frame engageable with a water pipe, a drill stem carried by said frame, a drill bit associated with said stem to be rotated therewith, and a bushing joining said bit and said stem and through a part of which said bit extends, said bushing being formed with an annular knife-edged portion around said bit to bite into the pipe after the bit has passed through the pipe wall and effect a seal against unintentional leakage from the pipe.

2. In a pipe tapping device, means for engaging a pipe, a drill associated with said means and operable to cut through the pipe wall, and means disposed around said drill movable therewith and shaped to define a groove with tapering walls to guide liquid squirting from the pipe away from the operator of said device.

3. In a pipe tapping device, means for engaging a pipe, a drill associated with said means and operable to cut through the pipe wall, and a member surrounding said drill movable therewith and shaped to bite into the pipe in a location around but spaced from the opening cut by the drill and function as a valve to prevent unintentional leakage from the pipe.

4. In a pipe tapping device, means for engaging a pipe, a drill associated with said means and operable to cut through the pipe wall, a member surrounding said drill movable therewith and shaped to bite into the pipe around the opening cut by the drill and function as a valve to prevent unintentional leakage from the pipe, and relatively soft gasket means for disposition around the drill and shaped to seat in said member for use in the event the pipe is too hard to be affected by said member.

5. In a pipe tapping device, means for engaging a pipe, a drill associated with said means and operable to cut through the pipe wall, and a member carried by said drill and having an annular knife-edge to bite into said pipe and effect a seal around the opening cut by the drill.

6. In a pipe tapping device, a frame, a drill stem carried by said frame, a cross-rib on the inner end of said drill stem, a bit having a cross groove in the head thereof to receive said rib, and a bushing to hold said bit and stem in operative engagement with each other.

7. In a pipe tapping device, a frame, a drill stem carried by said frame, a cross-rib on the inner end of said drill stem, a bit having a cross groove in the head thereof to receive said rib, and a bushing to hold said bit and stem in operative engagement with each other, said bushing being shaped to cut into a pipe being tapped and effect a seal around the opening made by said bit.

8. In a pipe tapping device, a frame, a drill carried by said frame, and a member disposed around said drill, the forward portion of said member being shaped to define an annular knife-edge spaced from and around the drill to cut into a pipe being tapped and effect a seal around the opening made by the drill, the outer wall of said member sloping outwardly away from said knife-edge to ultimately form the radially inner wall of a groove in said member rearwardly of said knife-edge, the other wall of said groove sloping radially outwardly and toward the pipe to be tapped to deflect any leakage from the pipe away from the operator of said device.

9. In a pipe tapping device, means for engaging a pipe, a drill stem associated with said means and movable relatively thereto toward and away from the pipe, a removable bit acuated by said stem to cut through the pipe wall, and means disposed around said bit and shaped to define an indentation with an outer tapering wall to guide fluid squirting from the pipe away from the operator of said device, the last said means also being arranged to operatively connect said bit with said stem.

ROY J. O'NEIL.